Be it known that I, ANDREW OPSAL, a citizen of the United States, and a resident of Portland, in the county of Multnomah and State of Oregon, have invented a new and useful Improvement in Swivels, of which the following is a specification, reference being had to the accompanying drawings as constituting a part thereof.

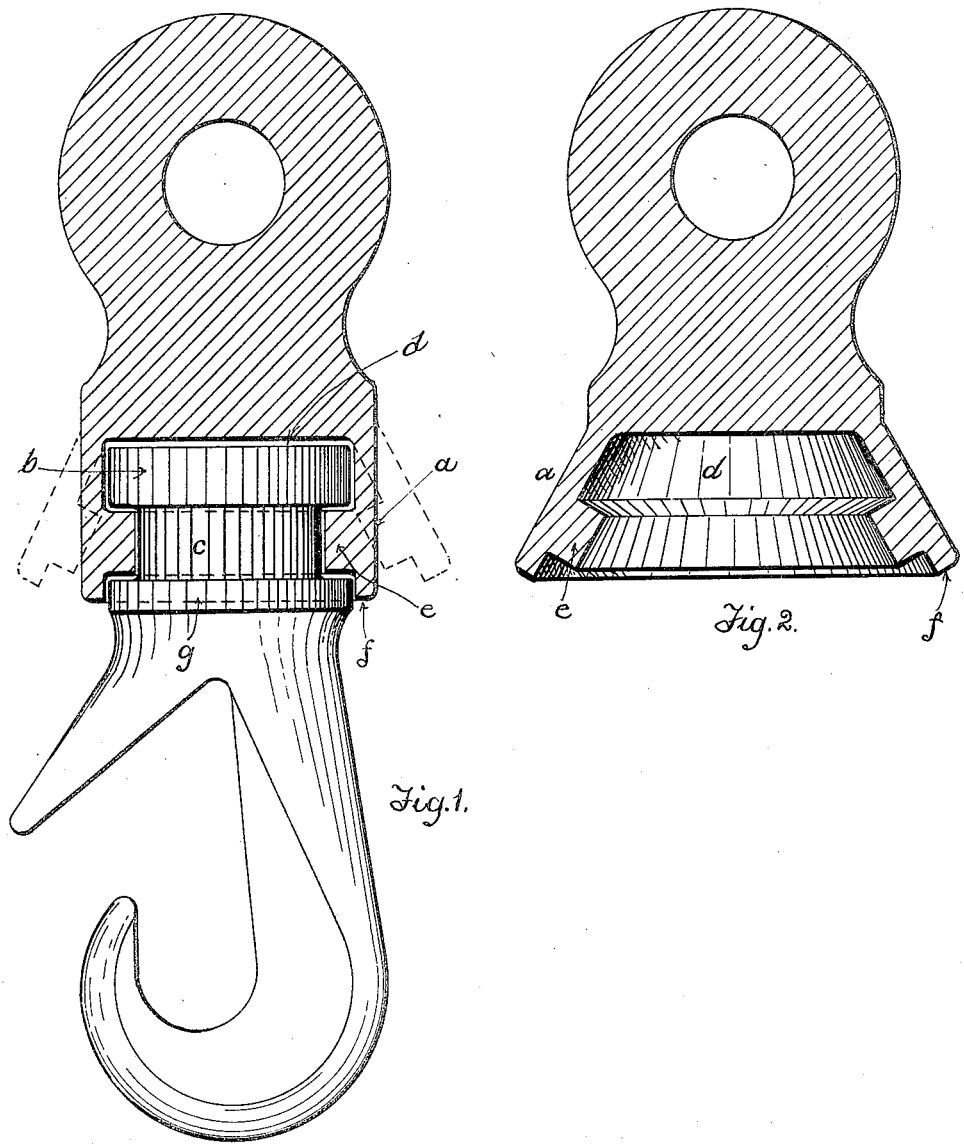

This invention relates to swivel-joints in general, and has for its object to obtain increased strength and durability by making the socket of the swivel in one integral piece, compressed upon and enveloping the bearing flanges of the head of the spindle of the swivel, as hereinafter described.

My invention includes, besides, certain special features of construction also described in the specification and illustrated in the drawings.

In the drawings, Figure 1 is a sectional elevation of my improvement applied to a swivel-hook, showing the same as it appears when the swivel is completed; and Fig. 2 is a longitudinal section of the socket part of my swivel.

Referring now to the letters as designating the parts described: the socket-member $a$ is a one-piece casting of malleable metal and has a chamber $d$ of such size as to receive therein the flanged-bearing head $b$ of the spindle-member $c$. The cross area of said chamber $d$ is made just a trifle larger than the diameter of the bearing-head $b$, so as to provide ample room for the rotation of the spindle $c$ in the socket-member. Projecting laterally from the inner faces of the annular wall of the chamber $d$ is an annular rib $e$. The latter is located inward from the mouth of the chamber $d$, and the wall of said chamber is extended outward in the form of a flange-like projection $f$, circumferentially enveloping the rib $e$. The rib $e$ of the socket-member and the flanged-bearing head $b$ of the spindle-member are made of equal thickness since they must equally bear the stress imposed upon the spindle in work. The spindle is further made with an annular flange $g$, corresponding in cross-section area with the rim-flange $f$ of the socket-member. The purpose of the last described feature is to provide additional means for taking care of the lateral torsional strain imposed upon my swivel in work. The rib $e$ of the socket-member $a$ is inserted in the circumferential space of the spindle $c$, intermediate the flanged-bearing head $b$ and the annular flange $g$.

To enable the insertion of the spindle-member in the chambered part $d$ of the socket-member, said chambered portion must be made sufficiently large to allow the flanged-bearing head $b$ of the spindle-member to pass the rib $e$ of the chamber $d$ of the socket-member. Without limiting myself to any special type of construction to accomplish this end, I deem it convenient to make the walls of said chamber $d$ flaring, as shown in Fig. 2, and also indicated in dotted outline in Fig. 1.

In putting the parts together, the spindle of my swivel is inserted in the chamber $d$ of the socket-member, after which the walls of the chambered portion $d$ of the socket are compressed upon the spindle, so as to irremovably engage the parts, as illustrated in Fig. 1. The compression of the chambered part $d$ of the socket-member may be done without heating the socket-member, but the preferable manner of proceeding, in my judgment, is to previously heat the socket-member so as to facilitate the compression of the chambered part thereof upon the spindle, as described. The compression of the chambered part $d$ of the socket-member $a$ on the spindle-member is accomplished by the usual and well known means and method.

The projecting rim-flange $f$ of the socket-member, enveloping the boss or flange $g$ of the spindle, also protects the bearing of the latter against dust and dirt.

I claim:

1. A swivel consisting of a one piece socket-member of malleable iron having a chamber with annular inwardly extending rib and depending right-lined rim flange, and a spindle member having a flanged bearing head and an annular right-lined flange separated therefrom, the parts being united with the rib of the socket-member engaged between the flanges of the spindle head, the depending flange of the socket-member embracing the outermost flange of the spindle head.

2. In a swivel, a one-piece socket member of malleable metal formed with a chamber to receive a flanged bearing head of a spindle member, an annular inwardly extending rib located inward from the mouth of the chamber, and a flange-like projection circumferentially enveloping said rib, said flange being of the same thickness as the flange of the bearing head, the walls of said chamber and flange being inclined and in line with each other and the inner wall of said rib being inclined and parallel to the inclination of the chamber and flange, said wall being designed to be brought with the inner faces thereof and of the flange in vertical parallelism.

ANDREW OPSAL.

Witnesses:
CECIL LONG,
S. M. PHILBRICK.